United States Patent
Kim et al.

(10) Patent No.: US 9,329,729 B2
(45) Date of Patent: May 3, 2016

(54) TOUCH PANEL AND TOUCH SCREEN HAVING THE SAME

(75) Inventors: Jin-Han Kim, Daegu (KR); Yeong-Seop Lee, Gumi-si (KR); Seok-Hong Jeong, Suwon-si (KR); Myung-Sop Lee, Gumi-si (KR); Kyoung-Suk Oh, Gumi-si (KR); Jung-Hun Woo, Gumi-si (KR); Dong-Chul Lee, Gumi-si (KR); Jong-Hyun Yim, Daegu (KR); Sung-Il Jang, Chilgok-gun (KR); Yong-Gu Cho, Uiwang-si (KR); Hyoung-Jun Go, Gumi-si (KR); Kyoung-Hun Kim, Gumi-si (KR); Jeong-Eun Kim, Gumi-si (KR); Hyeon-Beom Kim, Gumi-si (KR); Dae-Bin Noh, Gumi-si (KR); Jae-Young Park, Daegu (KR); Eun-Jin Baek, Gumi-si (KR); Chung-Hee Lee, Gumi-si (KR); Sung-Ho Jung, Gumi-si (KR); Jae-Wook Cho, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 13/418,891

(22) Filed: Mar. 13, 2012

(65) Prior Publication Data

US 2012/0235953 A1    Sep. 20, 2012

(30) Foreign Application Priority Data

Mar. 14, 2011  (KR) ........................ 10-2011-0022584

(51) Int. Cl.
*G06F 3/045* (2006.01)
*G06F 3/044* (2006.01)

(52) U.S. Cl.
CPC ...................... *G06F 3/044* (2013.01)

(58) Field of Classification Search
None
See application file for complete search history.

(56) References Cited

U.S. PATENT DOCUMENTS

| 8,243,030 B2 | 8/2012 | Jiang et al. |
| 2004/0036078 A1* | 2/2004 | Kondo ................ H01L 21/6835 257/80 |
| 2009/0096760 A1* | 4/2009 | Ma et al. ........................ 345/174 |
| 2009/0211891 A1 | 8/2009 | Lai et al. |

(Continued)

FOREIGN PATENT DOCUMENTS

| CN | 201159888 Y | 12/2008 |
| CN | 101464757 A | 6/2009 |

(Continued)

OTHER PUBLICATIONS

Korean Examination Report issued Aug. 17, 2012 in counterpart Korean Patent Application No. 10-2011-0022584 (5 pages, in Korean).

(Continued)

*Primary Examiner* — Adam R Giesy
*Assistant Examiner* — Henok Heyi
(74) *Attorney, Agent, or Firm* — NSIP Law (57) ABSTRACT

Provided herein is a capacitive-type touch panel. The capacitive-type touch panel may include a first transparent substrate, a first conductive layer positioned on the first transparent substrate, a sensor layer having a second conductive layer spaced from the first conductive layer by a spacer, and a second transparent substrate positioned on the sensor layer. The first conductive layer and the second conductive layer may be transparent.

21 Claims, 4 Drawing Sheets

(56) References Cited

U.S. PATENT DOCUMENTS

| | | |
|---|---|---|
| 2010/0024573 A1 | 2/2010 | Daverman et al. |
| 2010/0066702 A1 | 3/2010 | Lee et al. |
| 2010/0078231 A1 | 4/2010 | Yeh et al. |
| 2010/0156846 A1* | 6/2010 | Long et al. .................. 345/174 |
| 2010/0182256 A1 | 7/2010 | Jeong et al. |
| 2010/0182257 A1 | 7/2010 | Kang et al. |
| 2011/0074729 A1* | 3/2011 | Im et al. ...................... 345/174 |
| 2011/0080373 A1* | 4/2011 | Wang et al. .................. 345/174 |
| 2011/0109590 A1* | 5/2011 | Park ............................. 345/174 |
| 2011/0187672 A1* | 8/2011 | Hung et al. .................. 345/174 |
| 2011/0279169 A1* | 11/2011 | Salaverry ..................... 327/517 |
| 2012/0013573 A1 | 1/2012 | Liu et al. |
| 2012/0133607 A1* | 5/2012 | Chiu et al. ................... 345/174 |
| 2012/0139864 A1* | 6/2012 | Sleeman et al. ............. 345/174 |

FOREIGN PATENT DOCUMENTS

| | | |
|---|---|---|
| CN | 101782820 A | 7/2010 |
| EP | 0 640 936 A1 | 3/1995 |
| JP | 2010-079791 | 4/2010 |
| KR | 10-0627174 B1 | 9/2006 |
| KR | 10-2009-0076126 A | 7/2009 |
| WO | WO 97/18528 A1 | 5/1997 |
| WO | WO 2010/102470 A1 | 9/2010 |

OTHER PUBLICATIONS

Korean Decision of Grant issued Aug. 22, 2013 in counterpart application No. KR 10-2011-0022584. (8 pages, in Korean, with partial English translation).

Chinese Office Action issued Jul. 1, 2014 in counterpart Chinese Patent Application No. 201210066426.8 (26 pages, in Chinese with English Translation).

Extended European Search Report issued on Feb. 29, 2016, in counterpart European Application No. 12159436.0. (10 pages, in English).

* cited by examiner

TOUCH PANEL AND TOUCH SCREEN HAVING THE SAME

CROSS-REFERENCE TO RELATED APPLICATION

This application claims the benefit under 35 U.S.C. §119(a) of Korean Patent Application Serial No. 10-2011-0022584 filed on Mar. 14, 2011, in the Korean Intellectual Property Office, the entire disclosure of which is incorporated herein by reference for all purposes.

BACKGROUND

1. Field

The following description relates to a touch panel, and more particularly to a touch panel that supports various input methods and a touch screen having the same.

2. Description of the Related Art

In general, a touch screen refers to a device in which an input detection means is integrated into a display means. A touch screen may include a display unit, such as an LCD (Liquid Crystal Display), as well as a touch panel provided on such a display unit.

Such a touch screen receives a user's input through a screen touch. For example, the touch screen may recognize a character or a position displayed on a screen that is touched by the finger tip of a user or the tip of an object such as a stylus, without the use of a mechanical keypad.

Although not excellent in precision, touch screens are widely used as an information display device in a place frequently visited by people, for example, as in a public place like a subway station, a department store or a bank, due to the simplicity of operation of such a device. The touch screens are not only frequently applied to counter terminals in various stores, but also widely employed recently in portable terminals, such as mobile phones, DMB (Digital Multimedia Broadcasting) receivers, and car navigation systems.

The touch panels (or touch screens) are classified into a resistive overlay type, a capacitive type, a surface acoustic wave type, an infrared beam type, etc. At present, capacitive-type touch panels are most widely used.

However, conventional capacitive-type touch screens have a problem in that they are operated only when they are touched by a conductor, such as a human finger. Conventional capacitive-type touch screens do not sense the input when they are touched by a nonconductor object. This may cause inconveniences to a user due to the limited methods of input.

SUMMARY

In one general aspect, there is provided a capacitive-type touch panel. The capacitive-type touch panel may include a first transparent substrate, a first conductive layer positioned on the first transparent substrate, a sensor layer having a second conductive layer spaced from the first conductive layer by a spacer, and a second transparent substrate positioned on the sensor layer. The first conductive layer and the second conductive layer may be transparent.

The first conductive layer may be configured to have a preset reference electric potential, and the second conductive layer may be configured to sense a touch produced by a non-conductive user input object.

An air layer may be disposed between the first conductive layer and the second conductive layer, and a space provided in the air layer may be sealed.

The second transparent substrate may be attached to the sensor layer through an adhesive member.

In addition, the touch panel may include a film positioned between the sensor layer and the first conductive layer. The film may be disposed between an air layer formed by the spacer and the sensor layer. The first conductive layer may have a uniform thickness and a flat surface. The first conductive layer may be formed with ITO, PEDOT or the like.

In addition, the second conductive layer may include a plurality of first electrode lines and a plurality of second electrode lines. The plurality of electrodes and the plurality of second electrode lines may be spaced apart from each other via a bridge layer comprising an insulative dielectric material.

In another aspect, there is provided a touch screen with a capacitive-type touch panel. The touch screen may include a display unit having a plurality of pixels for displaying images through the pixels, and a capacitive-type touch panel attached to the display unit through an adhesive member.

The capacitive-type touch panel of such a touch screen may include a first transparent substrate, a first conductive layer positioned on the first transparent substrate, a sensor layer having a second conductive layer spaced from the first conductive layer by a spacer, and a second transparent substrate positioned on the sensor layer. The first conductive layer and the second conductive layer may be transparent.

The first conductive layer may be connected to a ground, and a touch detection signal with a preset voltage wave form may be applied to the second conductive layer.

The touch screen may also include a film positioned between the sensor layer and the first conductive layer. The film may be positioned between an air layer formed by the spacer and the sensor layer.

In addition, the second conductive layer may include a plurality of first electrode lines and a plurality of second electrode lines. The plurality of electrodes and the plurality of second electrode lines may be spaced apart from each other via a bridge layer formed from an insulative dielectric material.

In yet another aspect, there is provided a method of producing a touch screen. The method may involve attaching a touch panel to a display unit, in which the touch panel includes a first transparent substrate, a first conductive layer, a spacer layer, a sensor layer having a second conductive layer, a second transparent substrate, stacked in that order. The first conductive layer and the second conductive layer of the touch panel may be transparent.

The touch panel may be attached to the display unit via an adhesive member provided between a bottom side of the first transparent substrate and the display unit. The first conductive layer may be formed on the first transparent substrate via a vacuum deposition process.

Other features and aspects may be apparent from the following detailed description, drawings, and claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art.

Further, various specific definitions found in the following description are provided only to help general understanding of the present disclosure, and it is apparent to those skilled in the art that the described devices and methods can be implemented without such definitions. In addition, in the following description, a detailed description of known functions and configurations incorporated herein will be omitted when it may make the subject matter of the present disclosure rather unclear.

Figure 1:
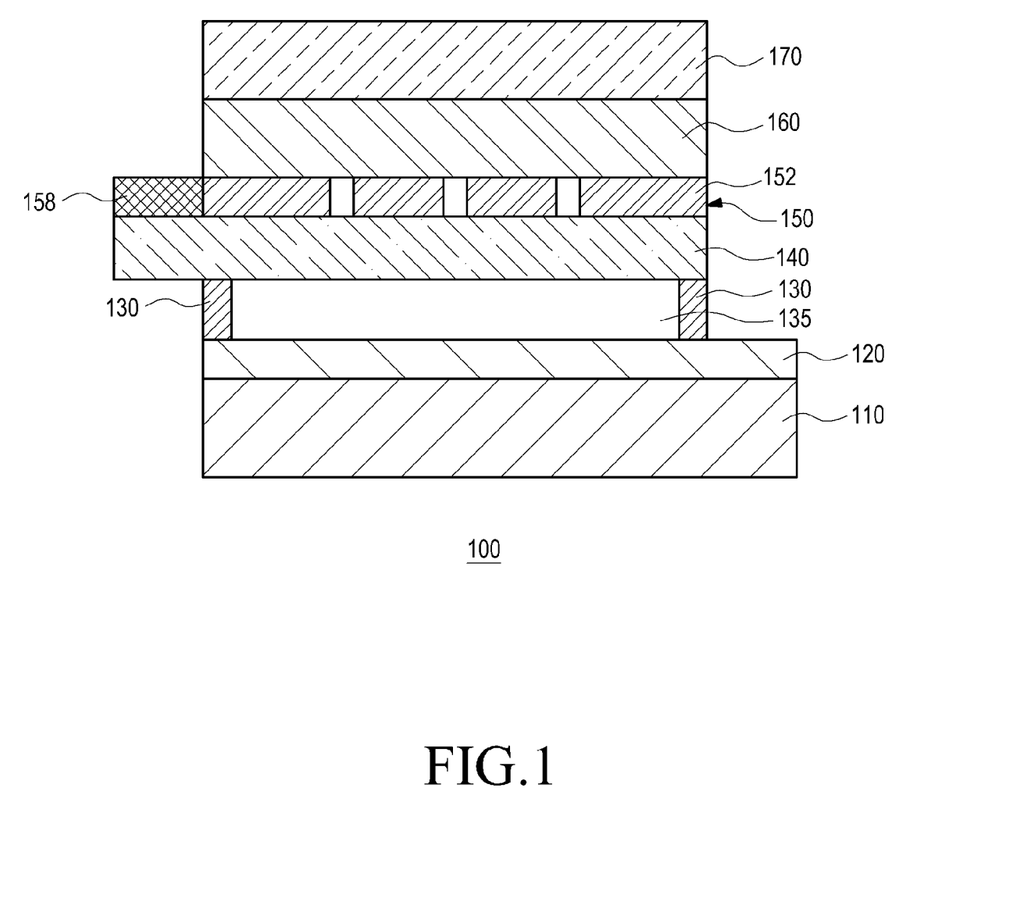
FIG. 1 is a schematic view illustrating a structure of one example of touch panel.

FIG. 1 illustrates a structure of an example of a touch panel. The touch panel 100 may include a first transparent substrate 110, a first conductive layer 120, a film 140, a sensor layer 150, and a second transparent substrate 170.

The first transparent substrate 110 may form a base part of the touch panel 100, and may have a rectangular plate shape. The first transparent substrate 110 may be formed from an insulative material transparent to visible light. Examples of such an insulative material include glass, polyethylene terephthalate (PET), polycarbonate (PC), polyethylene naphthalate (PEN), polyphenylene sulfide (PPS), polyethersulfone (PES) and the like.

The first conducive layer 120 may be laminated on the top of the first transparent substrate 110. That is, the first transparent substrate 110 may function as a support to the first conductive layer 120. The first conductive layer 120 may have a flat surface that is not provided with any pattern. The first conductive layer 120 may have a uniform thickness entirely. The first conductive layer 120 may have a preset reference electric potential (or voltage). For example, in a state in which it is connected to a ground and the touch panel 100 is being operated, the first conductive layer 120 may have a ground electric potential. The first conductive layer 120 may be referred to as a metallic layer, and it may be formed from a conductive material transparent to visible light. Examples of such a conductive material include indium tin oxide (ITO), poly(3,4-ethylenedioxythiophene) (PEDOT) and the like. The first conductive layer 120 may be formed from a process for forming a conductive film through a vacuum deposition process. Examples of such a vacuum deposition process include electron beam deposition, sputtering and the like.

The film 140 may be positioned on the top of the first conductive layer 120, and may function as a support to the sensor layer 150. The film 140 may also be spaced apart from the first conductive layer 120 by a spacer 130, and an air layer may be positioned between the film 140 and the first conductive layer 120. The space 135 between the film 140 and the first conductive layer 120 may be sealed. The film 140 may be formed from an insulative material transparent to visible light. Examples of such an insulative material include PET, PC, PEN, PES and the like.

The spacer 130 may be laminated on the top of the first conductive layer 120 or around the bottom of the film 140 and may have a substantially rectangular strip shape. The spacer 130 may be formed in a single body or in a plurality of parts spaced apart from each other. In addition, an adhesive member such as an adhesive, a sealant member, a spherical, cylindrical or polyhedral strength member, or a combination thereof may be used as the spacer 130. For example, a conventional curable material, such as a UV-curable material, may be employed as the adhesive member, and a metal, such as Au, Ag and Cu, a conductive polymer, such as polyacetylene may be employed as the strength member.

Although it is exemplified that the spacer 130 is laminated on the first conductive layer 120 in the present example, the first conductive layer 120 may be laminated only on an area of the top of the first transparent substrate 110 surrounded by the spacer 130 in another example of touch panel. In such a touch panel, the spacer 130 may be directly laminated on the top of the first transparent substrate 110.

In the touch panel of FIG. 1, the spacer 130 may perform a function of supporting the film 140 on the top of the first transparent substrate 110 to be spaced apart from the first transparent substrate 110. It may also perform a function of adhering the first transparent substrate 110 and the film 140 to one another.

The sensor layer 150 may be laminated on the top of the film 140, in which the sensor layer 150 may include a second conductive layer 152 and a plurality of connection terminals 158. The sensor layer 150 may be provided with a plurality of sensors to determine a position touched by the tip of a human finger or the tip of any other object on the surface of the second transparent substrate 170. For this purpose, the second conductive layer 152 may have a preset pattern. The second conductive layer 152 may have various patterns, such as a lattice pattern with straight lines, and a diamond pattern. Such a lattice pattern is described below.

Figure 2:
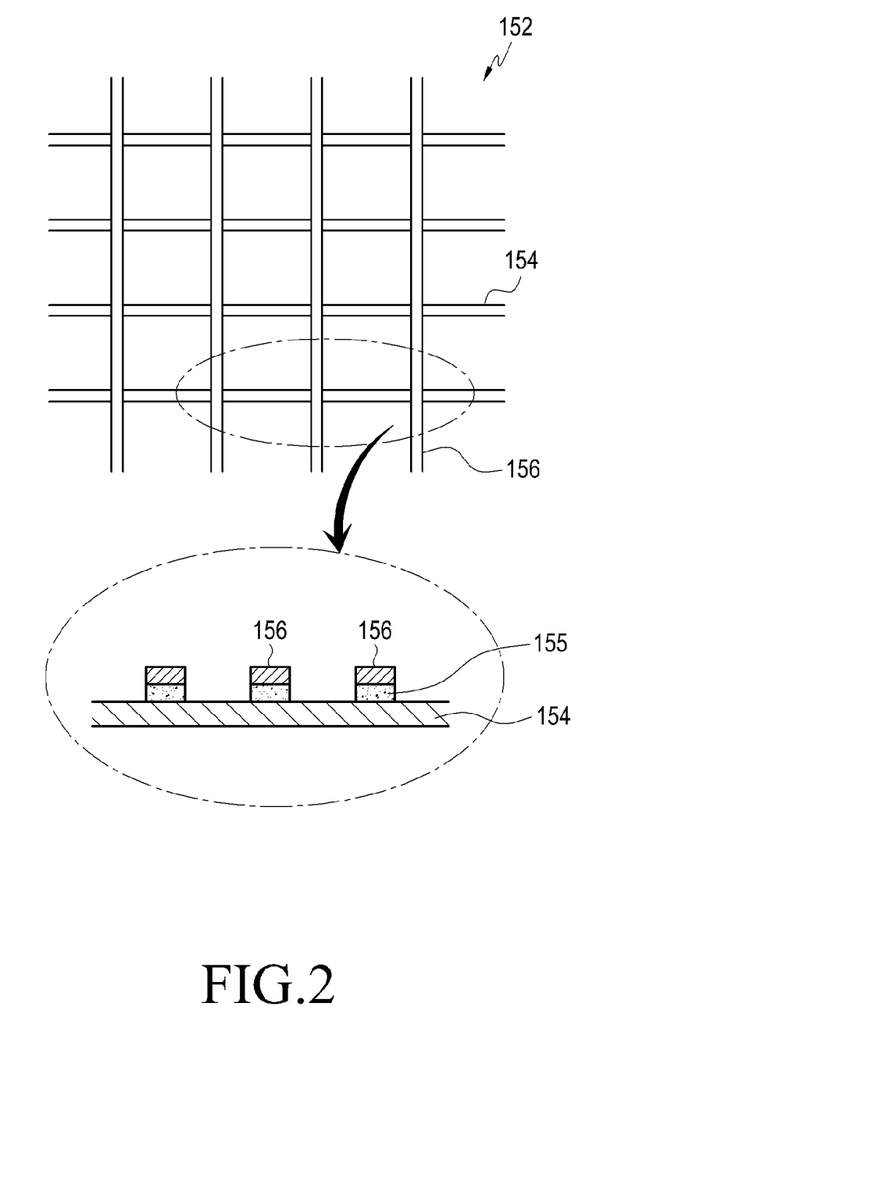
FIG. 2 is a schematic view illustrating an example of pattern of a second conductive layer.

FIG. 2 illustrates an example pattern of the second conductive layer 152. The second conductive layer 152 may include a plurality of first electrode lines 154 and a plurality of second electrode lines 156.

The first electrode lines 154 may extend in a first direction (for example, x-axis or horizontal direction), and may be spaced at regular or irregular intervals from each other along a second direction (for example, y-axis or vertical direction) that lies at right angles to the first direction.

The second electrode lines 156 may extend in the second direction, and may be spaced at regular or irregular intervals from each other along the first direction.

In order to electrically insulate the first electrode lines 154 and the second electrode lines 156, a bridge layer 155 may be interposed between the first and second electrode lines 154 and 156 at each of the crossing points of the first and second electrode lines 154 and 156. For example, the bridge layer 155 may consist of bridge units, each of which may be positioned at one of the crossing points of the first and second electrode lines 154 and 156. The bridge layer 155 may be formed from an insulative dielectric material, such as $SiO_2$.

Referring to FIG. 1 again, the second electrode layer 152 may be formed from a conductive material transparent to visible light. Examples of such a conductive material include indium tin oxide (ITO), poly(3,4-ethylenedioxythiophene) (PEDOT) and the like. The second electrode layer 152 may be formed by forming a thin film through a vacuum deposition process and then patterning the thin film through a lithography process. Examples of such a vacuum deposition process include electron beam deposition, sputtering and the like.

The connection terminals 158 for applying voltage (or current) to the second conductive layer 152 can be laminated on the top of the film 140 to be positioned outside of the second conductive layer 152. That is, in order to facilitate access to the connection terminals 158 from the outside, the connection terminals 158 can be arranged outside of the second conductive layer 152 (i.e., on a marginal area of the film 140).

The connection terminals 158 may be electrically connected with the second conductive layer 152 through connection lines (not shown), in which the second connection terminals 158 and the connection lines may be formed through a single process or through separate processes. In addition, the connection terminals 158 may be formed from a material that is the same with the material of the second conductive layer 152. Alternatively, the connection terminals 158 may be formed from a material that is different from the material that forms the second conductive layer 152. For example, the connection terminals 158 may be formed with an opaque conductive material, such as Ag. For example, the connection terminals 158 may be electrically connected with a flexible printed circuit board (FPCB) which is provided with a controller or the like.

In order to conduct the sensor function, a preset waveformed voltage (i.e., a touch detection signal) may be applied to the second conductive layer 152. When a conductive user input object (such as a finger) touches the surface of the second transparent substrate 170, a touch sensing signal with a changed voltage wave form may be produced due to the change of the capacitance between the second conductive layer 152 and the user input object. Hereinafter, the capacitance is referred to as first capacitance. The controller may analyze the touch sensing signal to determine whether the user input object touched or not touched the second transparent substrate 170, and to determine the touch position.

The touch panel may be provided with an additional second capacitance between the second conductive layer 152 and the first conductive layer 120; the second capacitance may allow the determination of the touch position as described above even when the user input object is not conductive. In addition, through a second capacitance providing unit, the touch panel may sense a push pressure of the user input object, such as a finger, a stylus or the like.

Figure 3:
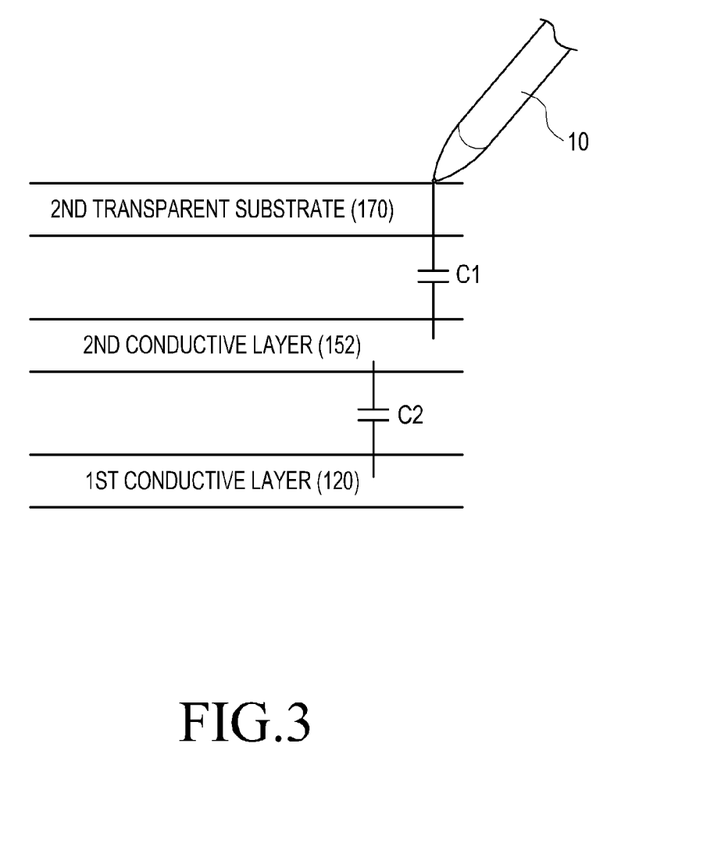
FIG. 3 is a schematic view illustrating an example of a method for detecting a touched position on a touch panel.

FIG. 3 illustrates a method of detecting a touch position of the touch panel 100. In FIG. 3, only the first and second conductive layers 120 and 150, and the second transparent substrate 170 are shown among the components of the touch panel 100.

In a case in which a non-conductive user input object 10 touches the surface of the second transparent substrate, the first capacitance C1 between the second conductive layer 152 and the user input object 10 might not be produced or changed before and after the touch. However, because the user input object 10 pushes the surface of the second transparent substrate 170, the second capacitance C2 between the second conductive layer 152 and the first conductive layer 120 is changed before and after the touch. That is, as the second conductive layer 152 is bent toward the first conductive layer 120 due to the push by the user input object 10, the space between the second conductive layer 152 and the first conductive layer 120 is locally changed, which causes the change of the second capacitance C2. Accordingly, the touch panel 100 can determine whether an input is attempted or not and can even determine the input position where the input was attempted; this occurs even if a non-conductive device is used by the user as the input object 10.

Referring to FIG. 1 again, the second transparent substrate 170 may be attached to the top of the second conductive layer 152 using an adhesive member 160. The top side of the second transparent substrate 170 may be exposed to the outside to form at least a part of the front surface of the touch panel 100. The second transparent substrate 170 may be formed with an insulative material that is transparent to visible light. Examples of such an insulative material include glass, polycarbonate, polyethylene terephthalate and the like.

The adhesive member 160 may be formed from an insulative material that is transparent to visible light. An optical clear adhesive (OCA) tape, an adhesive (or a sticking agent), a UV-curable resin or the like, which is transparent to visible light, can be used as the adhesive member 160. The OCA tape is a double-sided adhesive tape, and is typically formed from acryl, silicone or the like.

Although the sensor layer 150 may be laminated on the top of the film 140 in this example, the sensor layer 150 may be laminated on the bottom of the film 140 in another example. Alternatively, it is also possible to remove the film 140 and the adhesive member 160, to directly laminate the sensor layer 150 on the bottom of the second transparent substrate 170, and to interpose the spacer 150 between the first electrode layer 120 or the first transparent substrate 110 and the second conductive layer 152.

Figure 4:
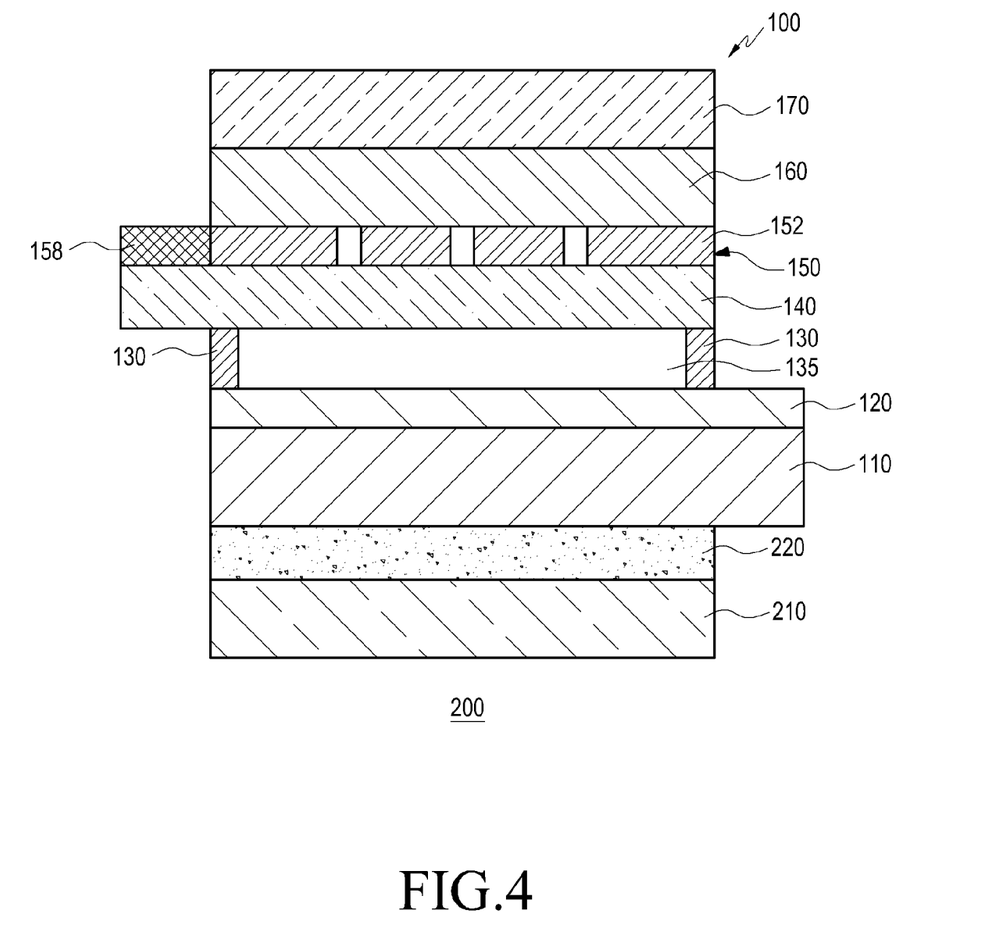
FIG. 4 is a schematic view illustrating a structure of one example of a touch screen.

FIG. 4 illustrates an example of a touch screen. The touch screen shown in FIG. 4 may include a touch panel 100 such as the one shown in FIG. 1. Duplicated descriptions concerning the touch panel 100 will be omitted.

The touch screen 200 may include a display unit 210, a touch panel 100 and a second adhesive member 220.

The display unit 210 may include a plurality of pixels to display images through the pixels. An LCD (Liquid Crystal Display), an OLED (Organic Light Emitting Diodes) or the like may be employed as the display unit 210.

An LCD may display images in accordance with the control of a controller (not shown). A conventional LCD may include: a liquid crystal display panel for displaying images, the liquid crystal display panel including a liquid crystal layer; and a BLU (Back Light Unit) for providing light to the liquid crystal display panel. The liquid crystal display panel may include upper and lower glass substrates arranged above and below the liquid crystal layer to control the arrangements of liquid crystal molecules. The lower glass substrate may include thin film transistors and pixel electrodes, and the upper grass substrate may include common electrodes. The liquid crystal panel may further include upper and lower polarization plates arranged above and below the liquid crystal layer to linearly polarize light as being input. The polarization directions of the upper and lower polarization plates may cross each other at a right angle.

The touch panel 100 may be attached (i.e., adhered) to the display unit through a second adhesive member 220. That is, the bottom side of the touch panel 100 (i.e., the bottom side of the first transparent substrate 110) may be attached to the top of the display unit 210 through the second adhesive member 220.

The bottom side of the second transparent substrate 170 may be anti-reflection (AR)-coated, in which the AR coating layer formed thereby may include an $Nb_2O_5$ layer and a $SiO_2$ layer. In the second AR-coated transparent substrate 170, the color difference value a* may be not more than 1.5, the color difference value b* may be not more than 1.5, the transmittance may be not less than 91%, and the reflectance may be 5% to 10%. In addition, the touch panel 100 may have a transmittance of not less than 88%. Here, the a* and b* are components of the CIE coordinate system for indicating colors, in which as the values thereof go further away from zero, stronger colors are indicated.

Because the top side of the second transparent substrate 170 may be exposed to the outside, a light interruption layer for interrupting visible light may be laminated on the bottom side of the second transparent substrate 170 along a marginal area surrounding the central area included in an effective display region in order to prevent the marginal area from being revealed to the outside. The light interrupting layer may be formed through a black ink printing process or the like.

The inventive touch panel and touch screen having the same are useful in that even if a user input object is non-conductive, the touch panel and touch screen can sense a push pressure applied by the non-conductive user input object through a second capacitance providing unit; thereby, the touch panel and touch screen can determine whether an input is attempted or not attempted and determine the input position where the input was attempted.

The touch panel and touch screen are input devices in which information can be freely input through a conductive or non-conductive user input object.

It is understood that the features of the present disclosure may be embodied in different forms and should not be construed as limited to the examples set forth herein. Rather, the examples are provided so that this disclosure will be thorough and complete, and will convey the full scope of the present disclosure to those skilled in the art.

The drawings may not be necessarily drawn to scale, and, in some instances, proportions may have been exaggerated in order to clearly illustrate features of the examples. When a first layer is referred to as being "on" a second layer or "on" a substrate, it may not only refer to a case where the first layer is formed directly on the second layer or the substrate but may also refer to a case where a third layer exists between the first layer and the second layer or the substrate.

A number of examples have been described above. Nevertheless, it will be understood that various modifications may be made. For example, suitable results may be achieved if the described techniques are performed in a different order and/or if components in a described system, architecture, or device are combined in a different manner and/or replaced or supplemented by other components, steps or their equivalents. Accordingly, other implementations are within the scope of the following claims.

What is claimed is:

1. A capacitive-type touch panel comprising:
a first transparent substrate;
a first conductive layer positioned on the first transparent substrate, the first conductive layer being transparent;
a sensor layer having a second conductive layer spaced from the first conductive layer by a spacer, the second conductive layer being transparent;
a second, flexible transparent substrate positioned on the sensor layer; and
a capacitance between the first and second conductive layers that is configured to vary in accordance with a variance in distance between the first and second conductive layers,
wherein the location of a touch event on the touch panel comprises a temporal depression of the second, flexible transparent substrate and is further identified by the location where the capacitance changes between the first and second conductive layers in response to the depression bending the second conductive layer toward the first conductive layer, and
wherein an air layer is disposed between the first conductive layer and the second conductive layer, and the air layer is sealed by the spacer which supports the second conductive layer and comprises first sides aligned collinearly with the second conductive layer and second sides defining a width of the spacer that is less than a width of the air layer between the first conductive layer and the second conductive layer.

2. The capacitive-type touch panel as claimed in claim 1, wherein the first conductive layer is configured to have a preset reference electric potential, and the second conductive layer is configured to sense a touch produced by a non-conductive user input object.

3. The capacitive-type touch panel as claimed in claim 1, wherein the second transparent substrate is attached to the sensor layer through an adhesive member.

4. The capacitive-type touch panel as claimed in claim 1, further comprising a film positioned between the sensor layer and the first conductive layer.

5. The capacitive-type touch panel as claimed in claim 4, wherein the film is disposed between the air layer formed by the spacer and the sensor layer.

6. The capacitive-type touch panel as claimed in claim 1, wherein the first conductive layer has a uniform thickness and a flat surface.

7. The capacitive-type touch panel as claimed in claim 1, wherein the first conductive layer comprises ITO or PEDOT.

8. The capacitive-type touch panel as claimed in claim 1, wherein the second conductive layer comprises first electrode lines and second electrode lines, the first electrode lines and the second electrode lines being spaced apart from each other via a bridge layer comprising an insulative dielectric material.

9. The capacitive-type touch panel as claimed in claim 8, wherein the bridge layer comprises bridge units each of which is disposed at a corresponding one of crossing points of the first and second electrode lines.

10. The capacitive-type touch panel as claimed in claim 1, wherein:
a central area of a bottom surface of the second transparent substrate is anti-reflection coated, and
a light interrupting layer for interrupting visible light is formed on a marginal area of the bottom surface of the second transparent substrate.

11. A touch screen with a capacitive-type touch panel, the touch screen comprising:
a display unit having pixels for displaying images through the pixels; and
a capacitive-type touch panel attached to the display unit through an adhesive member, wherein the capacitive-type touch panel comprises:
a first transparent substrate;
a first conductive layer positioned on the first transparent substrate, the first conductive layer being transparent;
a sensor layer having a second conductive layer spaced from the first conductive layer by a spacer, the second conductive layer being transparent;
a second, flexible transparent substrate positioned on the sensor layer; and
a capacitance between the first and second conductive layers that is configured to vary in accordance with a variance in distance between the first and second conductive layers,
wherein the location of a touch event on the touch panel comprises a temporal depression of the second, flexible transparent substrate and is further identified by the location where the capacitance changes between the first and second conductive layers in response to the depression bending the second conductive layer toward the first conductive layer, and
wherein an air layer is disposed between the first conductive layer and the second conductive layer, and the air layer is sealed by the spacer which supports the second conductive layer and comprises first sides aligned collinearly with the second conductive layer and second sides defining a width of the spacer that is less than a width of the air layer between the first conductive layer and the second conductive layer.

12. The touch screen as claimed in claim 11, wherein the first conductive layer is connected to a ground, and a touch detection signal with a preset voltage wave form is applied to the second conductive layer.

13. The touch screen as claimed in claim 11, further comprising a film positioned between the sensor layer and the first conductive layer.

14. The touch screen as claimed in claim 13, wherein the film is positioned between the air layer formed by the spacer and the sensor layer.

15. The touch screen as claimed in claim 11, wherein the second conductive layer comprises first electrode lines and second electrode lines, the first electrode lines and the second electrode lines being spaced apart from each other via a bridge layer formed from an insulative dielectric material.

16. The touch screen as claimed in claim 15, wherein the bridge layer comprises bridge units each of which is disposed at a corresponding one of crossing points of the first and second electrode lines.

17. The touch screen as claimed in claim 11, wherein:
 a central area of a bottom surface of the second transparent substrate is anti-reflection coated, and
 a light interrupting layer for interrupting visible light is formed on a marginal area of the bottom surface of the second transparent substrate.

18. A method of producing a touch screen, the method comprising:
 attaching a touch panel to a display unit, wherein
 the touch panel comprises a first transparent substrate, a first conductive layer, a spacer layer, a sensor layer having a second conductive layer, and a second, flexible transparent substrate, stacked in order,
 the first conductive layer and the second conductive layer are transparent,
 a capacitance exists between the first and second conductive layers that is configured to vary in accordance with a variance in distance between the first and second conductive layers, and
 the location of a touch event on the touch panel comprises a temporal depression of the second, flexible transparent substrate and is further identified by the location where the capacitance changes between the first and second conductive layers in response to the depression bending the second conductive layer toward the first conductive layer, and
 wherein an air layer is disposed between the first conductive layer and the second conductive layer, and the air layer is sealed by the spacer layer which supports the second conductive layer and comprises first sides aligned collinearly with the second conductive layer and second sides defining a width of the spacer layer that is less than a width of the air layer between the first conductive layer and the second conductive layer.

19. The method of producing a touch screen as claimed in claim 18, wherein the touch panel is attached to the display unit via an adhesive member provided between a bottom side of the first transparent substrate and the display unit.

20. The method of producing a touch screen as claimed in claim 19, wherein the first conductive layer is formed on the first transparent substrate via a vacuum deposition process.

21. The method of producing a touch screen as claimed in claim 18, wherein:
 a central area of a bottom surface of the second transparent substrate is anti-reflection coated, and
 a light interrupting layer for interrupting visible light is formed on a marginal area of the bottom surface of the second transparent substrate.

\* \* \* \* \*